(12) United States Patent
Chen et al.

(10) Patent No.: US 8,237,791 B2
(45) Date of Patent: Aug. 7, 2012

(54) VISUALIZING CAMERA FEEDS ON A MAP

(75) Inventors: Billy Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1103 days.

(21) Appl. No.: 12/050,944

(22) Filed: Mar. 19, 2008

(65) Prior Publication Data

US 2009/0237510 A1   Sep. 24, 2009

(51) Int. Cl.
*H04N 7/18* (2006.01)
*H04N 13/02* (2006.01)
*G06T 15/00* (2011.01)

(52) U.S. Cl. ........... 348/143; 348/48; 348/159; 345/419

(58) Field of Classification Search .................. 348/159, 348/149, 143, 48, 51, 52, 160; 345/419; 701/468
See application file for complete search history.

(56) References Cited

U.S. PATENT DOCUMENTS

| | | | |
|---|---|---|---|
| 4,847,772 A | 7/1989 | Michalopoulos et al. | |
| 5,517,419 A | 5/1996 | Lanckton et al. | |
| 5,850,352 A | 12/1998 | Moezzi et al. | |
| 5,990,935 A | 11/1999 | Rohlfing | |
| 6,778,171 B1 | 8/2004 | Kikinis | |
| 6,940,538 B2 | 9/2005 | Rafey et al. | |
| 7,193,645 B1 * | 3/2007 | Aagaard et al. | 348/211.3 |
| 7,212,228 B2 | 5/2007 | Utsumi et al. | |
| 7,920,959 B1 * | 4/2011 | Williams | 701/117 |
| 2001/0024533 A1 | 9/2001 | Kriegman | |
| 2003/0023974 A1 * | 1/2003 | Dagtas et al. | 725/47 |
| 2003/0210329 A1 | 11/2003 | Aagaard et al. | |
| 2005/0088515 A1 | 4/2005 | Geng | |
| 2005/0220361 A1 | 10/2005 | Yamasaki | |
| 2005/0225634 A1 * | 10/2005 | Brunetti et al. | 348/143 |
| 2007/0118281 A1 | 5/2007 | Adam et al. | |
| 2007/0257819 A1 | 11/2007 | Manor | |
| 2008/0088706 A1 * | 4/2008 | Girgensohn et al. | 348/207.99 |
| 2008/0101456 A1 * | 5/2008 | Ridge et al. | 375/240.01 |
| 2009/0141966 A1 | 6/2009 | Chen et al. | |

FOREIGN PATENT DOCUMENTS

WO    2007094765 A2    8/2007

OTHER PUBLICATIONS

Kogut, et al., "Maintaining the Identity of Multiple Vehicles as They Travel Through a Video Network", Proceedings of the IEEE Workshop on Multi-Object Tracking (WOMOT'01), Year of Publication: 2001, pp. 29-34.

Moezzi, et al., "Reality Modeling and Visualization from Multiple Video Sequences", IEEE Computer Graphics and Applications, vol. 16, Issue 6 (Nov. 1996), Year of Publication: 1996, pp. 58-63.

(Continued)

*Primary Examiner* — Patrice Winder
*Assistant Examiner* — Ebrahim Golabbakhsh

(57) ABSTRACT

Feeds from cameras are better visualized by superimposing images based on the feeds onto map based on a two- or three-dimensional virtual map. For example, a traffic camera feed can be aligned with a roadway included in the map. Multiple videos can be aligned with roadways in the map and can also be aligned in time.

20 Claims, 4 Drawing Sheets

OTHER PUBLICATIONS

Shahri, et al., "A Graph-Based Approach to Vehicle Tracking in Traffic Camera Video Streams", ACM International Conference Proceeding Series; vol. 273, Proceedings of the 4th workshop on Data management for sensor networks: in conjunction with 33rd International Conference on Very Large Data Bases, Austria, Session: Novel sensing modalities, Year of Publication: 2007, pp. 19-24.

"International Search Report", Filed Date Feb. 16, 2009, Application No. PCT/US2009/034194, pp. 1-11.

Office Action from The State Intellectual Property Office of The People's Republic of China regarding Application No. 200980110106.4 dated Apr. 24, 2012.

* cited by examiner

VISUALIZING CAMERA FEEDS ON A MAP

BACKGROUND

Traffic camera feeds deliver video images to users over the Internet. Such feeds are becoming both abundant and familiar to Internet users.

In one implementation, a user is presented with an array of available camera feeds for a geographic region of interest. Each feed may be represented as a thumbnail image so that multiple feeds can be seen at the same time. For easier viewing, the user can select and enlarge a thumbnail image.

In another implementation, a relatively conventional map (e.g., a street map) is displayed, in which the streets and highways are represented as lines. The map also includes icons that show the locations of traffic cameras. The user can click on one of the icons to select a traffic camera and display its feed.

The formats described above are useful to a limited extent, but they also have shortcomings that prevent their full potential from being realized. For example, it may be difficult for a viewer to understand which direction a camera is facing or which street the camera is recording. Compounding this problem, the orientation of the camera may change dynamically over the course of a day. Also, feeds from different cameras may be captured at different times, making it difficult for a viewer to assimilate the information from each of the feeds. These problems become more acute as the number of traffic cameras increases. For example, in some cities, streets are monitored using thousands of cameras.

SUMMARY

Feeds from cameras are better visualized by superimposing images based on the feeds onto a map based on a two- or three-dimensional virtual map.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Figure 1:
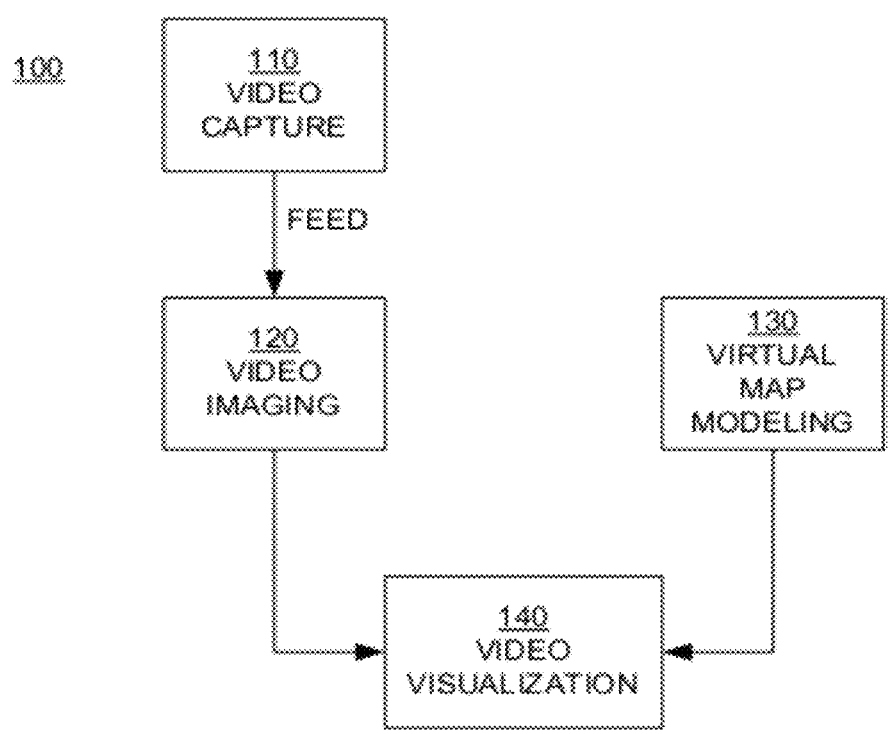
FIG. 1 is a block diagram of one embodiment of a video visualization system.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "superimposing," "rendering," "aligning," "projecting," "correlating," "overlaying," "simulating," "calibrating," "displaying," "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

According to embodiments described herein, one or more camera feeds, such as traffic camera feeds, can be visualized in a single map view. Camera feeds can include still or video images. In a sense, a video consists of a succession of still images. Therefore, although the discussion below focuses primarily on video feeds, that discussion can be readily extended to include cases that involve one or more still images.

The map can be a two-dimensional (2D) or three-dimensional (3D) map referred to herein as a "virtual globe" or "virtual world map" or, most generally, as a "virtual map." A virtual globe map may include man-made features, such as roads and buildings, as well as natural features. An example of a virtual globe map is Virtual Earth 3D™ by Microsoft®. In general, a virtual globe map is a 3D software model or representation of the Earth. That is, the 3D model possesses 3D data about the natural terrain and any man-made features. A virtual globe map may incorporate a digital elevation map (DEM). Virtual maps can also be produced for smaller scale structures such as rooms and building interiors.

Although display screens are two-dimensional surfaces, a map rendered in 3D allows a viewer to change viewing angle and position with limited distortion. The discussion below focuses primarily on 3D maps. A 2D rendering is simply a special instance of a 3D rendering, and so the discussion can be readily extended to 2D maps.

The discussion below uses traffic camera feeds as a prime example—as will be described, traffic camera feeds can be integrated into a virtual map so that the movement of cars and the like are visualized against the backdrop of the virtual map. However, embodiments described herein are not so limited and may be used in applications other than monitoring traffic. For example, the discussion below can be readily extended to visualizing the movement of pedestrians along pavements or within buildings, or the movement of objects and people on the production floor of a factory.

Visualizing a camera feed on a virtual map entails aligning the feed with the features of the map. For example, to visualize a feed from a traffic camera on a map, the traffic is aligned with the road layout of the map. Visualizing a camera feed on a virtual map provides context about where the camera is pointing and what road the camera is covering. When multiple feeds are simultaneously visualized, the feeds can also be aligned in time. Presenting the feeds in a single view allows a user to more quickly comprehend the coverage provided by each camera feed. A user can also comprehend the relationships between camera feeds, allowing the user to infer causes and effects and to interpolate information for areas not covered by neighboring cameras. For example, if one camera shows a traffic accident and a neighboring camera shows a traffic backup, then the user can infer that the backup is due to the accident, and that the stretch of roadway between cameras is also backed up.

FIG. 1 is a block diagram of one embodiment of a video visualization system 100 that achieves the above. Aspects of the system 100 can be implemented as computer-executable components stored in a computer-readable medium.

In the example of FIG. 1, the system 100 includes a video capture component 110, a video imaging component 120, a virtual map modeling component 130, and a video visualization component 140. While these components are represented as separate elements, they may not be implemented as such. In general, the system 100 provides functionality about to be described, and that functionality can be accomplished using a single functional element or multiple functional elements, on a single device or computer system or distributed over multiple devices/computer systems.

The video capture component 110 receives and processes a feed from one or more video cameras (not shown). For example, the video capture component 110 may digitize and/or encode (compress) video images captured by the video cameras. A video capture component 110 may be implemented on each of the video cameras.

In the example of FIG. 1, the video imaging component 120 receives and processes (e.g., decodes) the feed from the video capture component 110. The video imaging component 120 can perform other types of processing; refer to the discussion below, such as the discussion of FIGS. 4A-4C, for examples of some of the other types of processing that may be performed.

Continuing with reference to FIG. 1, the virtual map modeling component 130 generates a 2D or 3D virtual map. The video visualization component 140 combines the output of the video imaging component 120 and the virtual map modeling component 130 and renders the result. Generally speaking, the video visualization component 140 integrates the feeds from one or more cameras with a 2D or 3D map that is based on the virtual map and renders the resultant integrated feed(s)/map. In other words, the video visualization component 140 cuts-and-pastes frames of video into a map derived from a 3D virtual map.

To properly visualize each feed on a map, each camera is aligned with the map. A camera can be aligned to the map by aligning features in its video feed with corresponding features in the map. For example, a traffic camera feed generally includes vehicles moving on a roadway; to align the traffic camera and the map, the roadway in the video is mapped to and aligned with the corresponding roadway in the map. Consequently, the vehicles contained in the video are also properly placed and oriented within the map.

Alignment of a camera and map can be manual, automatic, or a combination of both. Fully manual alignment involves specifying corresponding points in the video and the map. The more points specified, the better the alignment. The correspondence enables computation of a warping function that maps the frames of a video onto the correct portion of the map. Fully automatic alignment can be implemented by matching features in the video to features in the map and then aligning those features.

A combination of manual and automatic alignment techniques can be used to realize the advantages of both types of techniques while avoiding some of their shortcomings. First, corresponding points can be manually specified to calibrate the internal parameters of the camera (e.g., focal length, principal point, and skew) and the initial position and orientation of the camera. Second, features in the video can be computed using low-level vision techniques and then used to automatically realign the camera as needed. Additional information is provided in conjunction with FIG. 6. A combination of manual and automatic techniques avoids some of the tediousness and human error associated with a fully manually technique; instead, manual actions are limited to the initial alignment as subsequent alignments are performed automatically. A combination of techniques is also more robust than a fully automatic technique. For example, if a particular feature in a video is being relied upon for alignment, but that feature is missing from the map, then the attempt at alignment would likely fail without human intervention.

After initial alignment of a camera, the camera may be moved either intentionally or because of effects such as the wind. If the camera moves, the correspondence between points in the video and in the map may again be manually specified to compensate. Alternatively, the camera can be automatically realigned as mentioned above.

Figure 2:
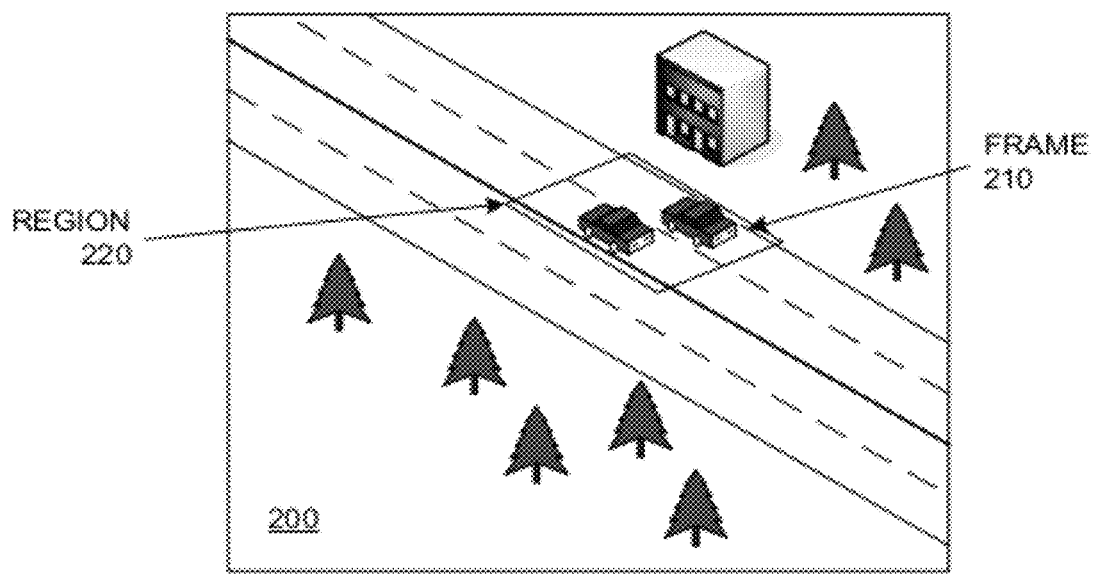
FIG. 2 illustrates a video feed overlaid onto a virtual globe map.

FIG. 2 illustrates an image (e.g., video) frame 210 overlaid onto a region 220 of a virtual globe map 200. Although objects (e.g., the vehicles, trees, building and roadway) are illustrated in cartoon-like fashion in FIG. 2, in actual practice those objects are more realistically rendered. In actual practice, the quality of the video determines the quality of the objects within the frame 210, while the objects outside the frame 210 are generally of photographic quality, as in Virtual Earth 3D™, for example.

Utilizing a video visualization system such as system 100 (FIG. 1), the frame 210 is captured by a camera (e.g., a traffic camera) and integrated into the map 200. Frame 210 represents an image of the area that is within the camera's field of vision at a particular point in time. As shown in the example of FIG. 2, the frame 210 is essentially embedded (overlaid or superimposed) into the map 200. That is, the frame 210 is pasted into the region 220 of the map 200, while the remainder of the map 200 is used to fill in the areas around the region 220. As mentioned above, the camera and the map 200 can be calibrated so that each frame is properly placed and properly oriented within the map display.

Successive (video) frames can be overlaid onto the map 200 in a similar fashion such that a viewer would see the movement of traffic, for example, within the region 220. In essence, dynamic information (the video feed) is integrated within the static image that constitutes the map 200. The viewer is thereby provided with an accurate representation of, for example, actual traffic conditions.

Furthermore, if there are multiple cameras covering the geographic area encompassed by the displayed portion of the map 200, then frames from those cameras can be similarly overlaid onto corresponding regions of the map. Each of the cameras can be calibrated with the map 200 so that their respective videos are properly placed and properly oriented within the map display.

Should the position of any camera change from its initial position, the camera can be recalibrated (realigned), as mentioned above. Consequently, its feed would be visualized at a different point in the map 200, so that the video captured by the repositioned camera would still be properly aligned with the other features of the map. In other words, the region 220 is associated with a particular camera; if the camera is moved, then the region 220 would also be moved to match.

Figure 3:
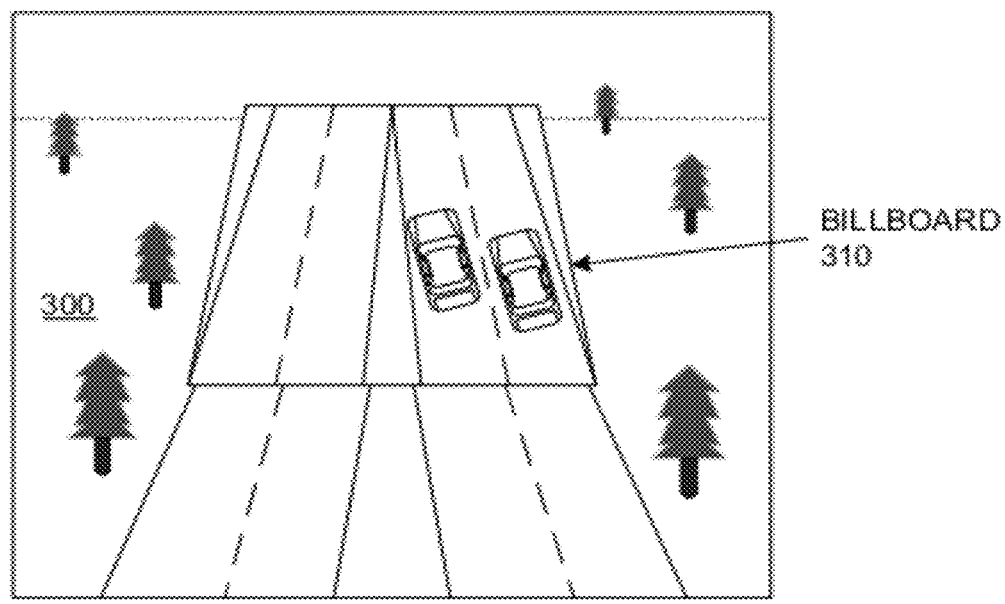
FIG. 3 illustrates a billboard overlaid onto a virtual globe map.

Camera feeds can be visualized in ways different from that just described. Another way to visualize a camera feed is to render the video as an animated texture on a "billboard" that is superimposed onto a virtual globe map. FIG. 3 illustrates a billboard 310 overlaid onto a map 300. As discussed above, objects are illustrated in cartoon-like fashion in FIG. 3, but in actual practice those objects are more realistically rendered.

The billboard 310 is planar and rectangular (although it appears to be non-rectangular when viewed in perspective) and aligned to the features (e.g., the roadway) of map 300 in the manner described above. Each texture in the animation plays a frame from the video so that the effect is that traffic, for example, appears to move along the billboard 310. As in the example of FIG. 2, alignment of the billboard 310 with the map 300 is relatively straightforward, and the viewer is provided with an accurate representation of, for example, actual traffic conditions.

An alternative to the above is to use a digital elevation map (DEM) that includes a road layout, to provide a 3D effect that otherwise may not be apparent with the use of a billboard. In a sense, a camera can be thought of as a slide projector that projects its "slides" (frames) onto the DEM, creating the effect that objects in the video (e.g., traffic) are following the contours of the DEM. The resultant display would be similar to that shown by FIG. 2. Another advantage to the use of a DEM is that, if the camera changes direction, the video feed can still be visualized with limited distortion.

The feed from a video camera includes information that may be of limited interest to a user. For example, a traffic camera may capture details of the environment surrounding a roadway when a viewer is only interested in the volume of traffic on the roadway. To address this, the background can be removed from the video feed so that, for example, only the traffic remains. One way to accomplish this is to extract only those objects in the video that are moving. To do this, the median value for each pixel in the video is determined over a period of time. Then, each per-pixel median value is subtracted from the corresponding pixel value in each frame of the video to produce an alpha matte that shows only the moving objects.

Figure 4A:
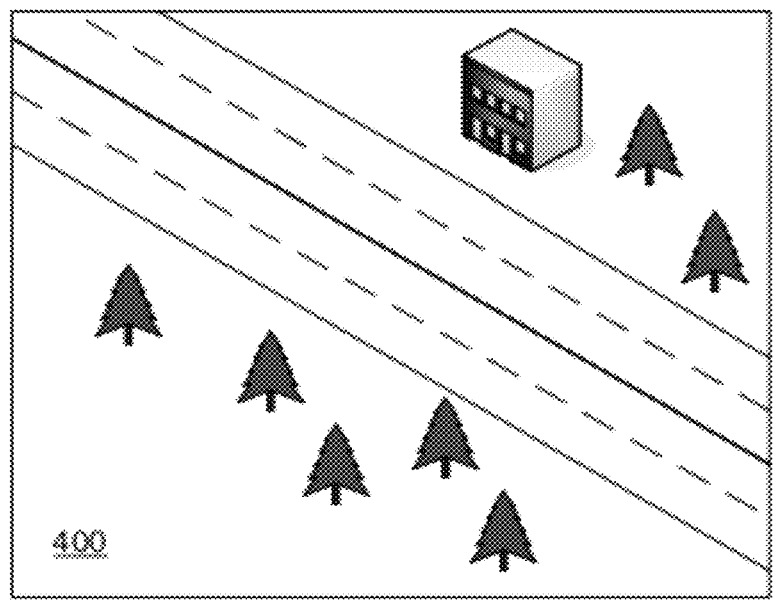
FIGS. 4A, 4B and 4C illustrate the extraction of certain objects from a video feed.
Figure 4B:
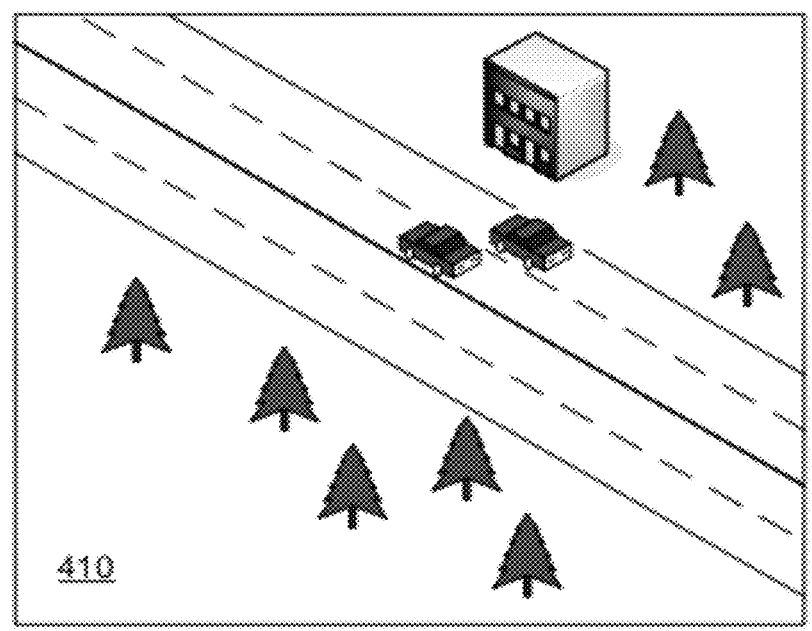
Figure 4C:
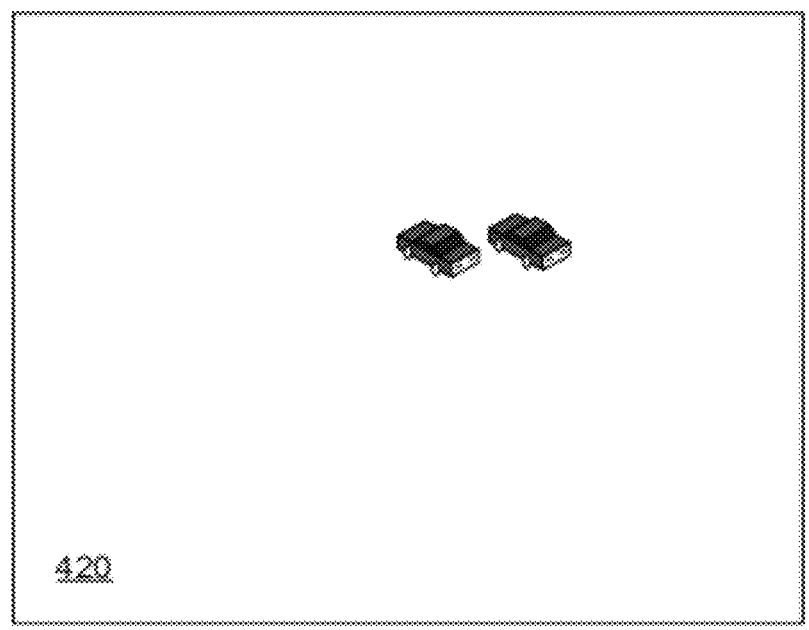

FIGS. 4A, 4B and 4C illustrate the extraction of certain objects from a video feed. As in the examples above, objects are illustrated in cartoon-like fashion, but in actual practice those objects can be more realistically rendered. FIG. 4A illustrates a median image 400. FIG. 4B shows a typical frame 410. FIG. 4C shows one frame of an alpha-matted image 420. The alpha-matted image 420 can then be superimposed onto a virtual globe map or DEM in a manner similar to that described above. The resultant display would be similar to that shown by FIG. 2.

Other approaches can be used to extract objects from a video feed. For example, a classifier can be trained to recognize cars and other types of traffic. The use of a classifier may increase computational complexity, but it also allows non-moving objects (e.g., cars stopped in traffic) to be recognized and extracted from a video feed.

An extension to the approach just described is to replace an extracted object with an abstraction or simulation of that object. For example, instead of rendering actual images of vehicles from a traffic feed as described in conjunction with FIGS. 4A-4C, a simulated vehicle can be displayed on the map. In essence, the vehicles in the alpha-matted display 420 are replaced with synthetic representations of vehicles. More specifically, the location and speed of each of the objects in the alpha-matted display 420 can be tracked from frame to frame to compute the position of each object versus time. Only the position of each object needs to be sent from the video imaging component 120 to the video visualization component 140 (FIG. 1), reducing bandwidth requirements. The resultant display would be similar to that shown by FIG. 2 or FIG. 3, but now the objects within the region 220 or the billboard 310 would perhaps be cartoon-like, although more detailed simulations can be used.

In addition to reducing bandwidth requirements, the use of simulated objects has a number of other advantages. The tracking of each object's position versus time allows the position of the object to be extrapolated to areas outside the field of vision of the camera. Also, the rendering of the objects is standardized (simulated), and therefore it is independent of the camera resolution, lighting conditions, the distance of the object from the camera, and other influences. In addition, the visualization of the camera feed is more tolerant of noise resulting from misalignment of the camera.

The maps, including video feed(s), may be part of a larger display. For example, the map/feed visualizations may be accompanied by text, including symbols, numbers and other images, that provide additional information such as statistics, traffic summaries, weather conditions, links to other Web sites, and the like. Furthermore, such information may be superimposed onto the map. Also, such information can be added to the video feed before it is superimposed onto the map. In general, additional information may be presented in the display areas bordering the map or within the map itself.

Figure 5:
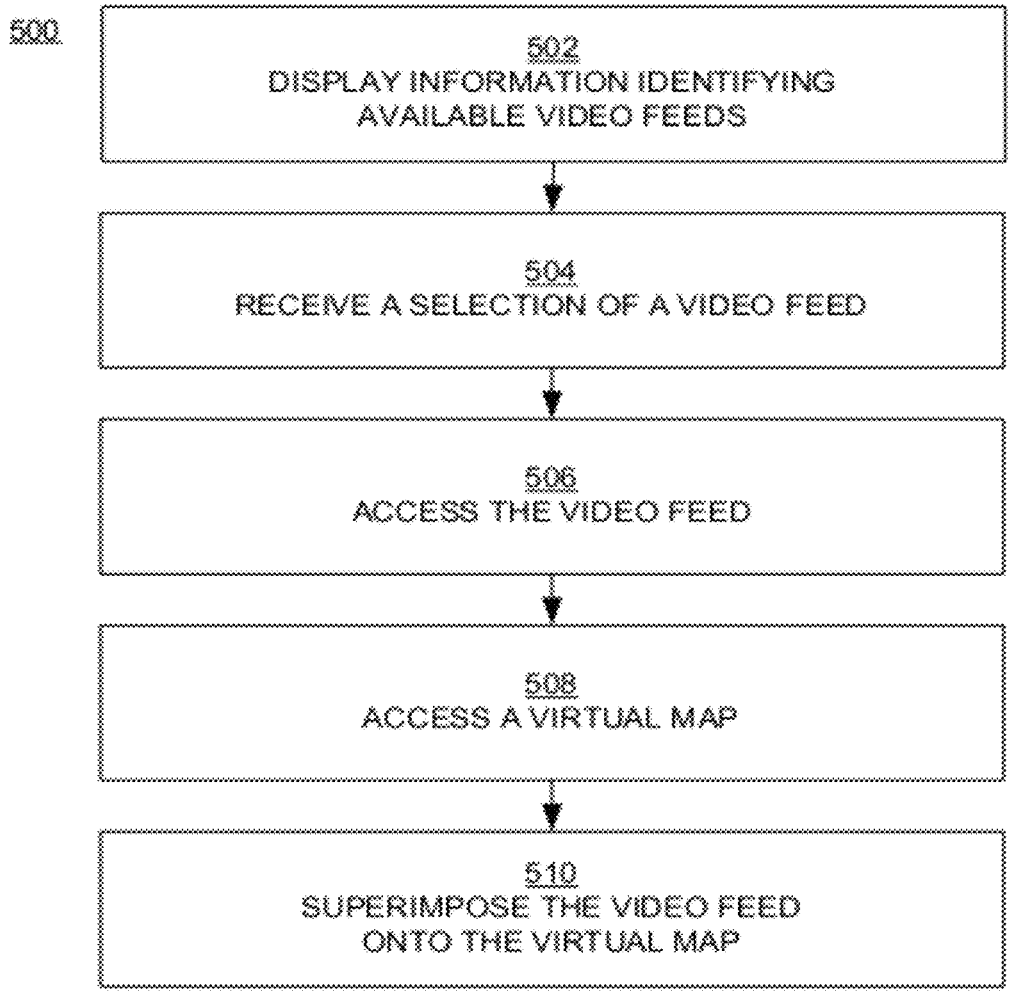
FIG. 5 is a flowchart of one embodiment of a method for visualizing a video feed.
Figure 6:
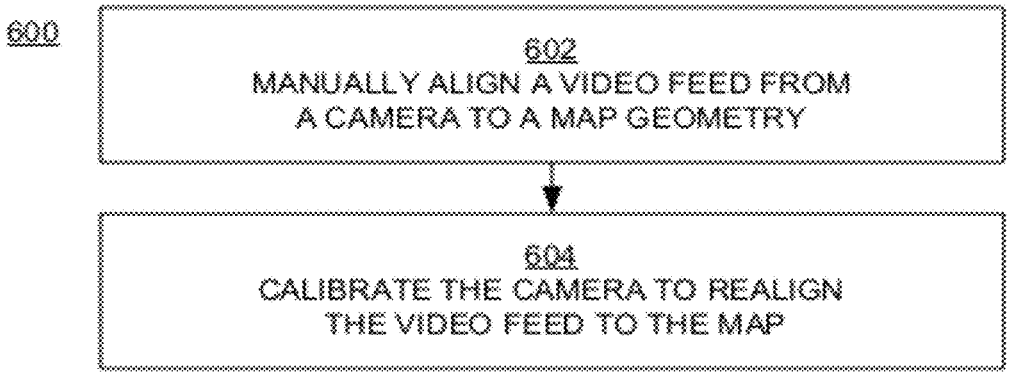
FIG. 6 is a flowchart of one embodiment of a method for calibrating a video camera.

FIG. 5 is a flowchart 500 summarizing one embodiment of a method for visualizing a video feed. FIG. 6 is a flowchart 600 of one embodiment of a method for calibrating a video camera to a virtual map. Although specific steps are disclosed in the flowcharts 500 and 600, such steps are exemplary. That is, various other steps or variations of the steps recited in the flowcharts 500 and 600 can be performed. The steps in the flowcharts 500 and 600 may be performed in an order different than presented. Furthermore, the features of the various embodiments described by the flowcharts 500 and 600 can be used alone or in combination with each other. In one embodiment, the flowcharts 500 and 600 can be implemented as computer-executable instructions stored in a computer-readable medium.

With reference first to FIG. 5, in block 502, a user is presented with an array of available camera feeds. In block 504, the user selects one or more of the camera feeds. In block 506, the selected feeds are accessed and received by, for example, the video visualization component 140 of FIG. 1. In block 508, the video visualization component 140 also accesses a virtual map. In block 510, the selected video feeds are superimposed onto the virtual map and the results are displayed. More specifically, depending on the user's selections, one or more feeds can be visualized simultaneously against a 2D or 3D background. Additional information is provided in the discussion of FIGS. 2, 3 and 4A-4C, above.

With reference now to FIG. 6, in block 602, the video feed from the camera is manually aligned with the 3D geometry of the map. Internal parameters of the camera (such as its focal length, principal point, and skew) as well as other parameters (such as the camera's orientation) are determined. For example, a user (not necessarily the end user, but perhaps a user such as a system administrator) can interactively calibrate ("geoposition") an image (e.g., a frame) from the feed to a known 3D geometry associated with the map. In essence, the actual (real world) location of the camera is mapped to a location in the 3D map model.

In block 604, calibration and low-level vision techniques are used to automatically update the camera's parameters, which may change due to, for example, wind effects or scheduled rotation of the camera. For a traffic camera feed, the low-level vision techniques are used to determine the general direction of traffic flow (a "traffic vector") shown in the feed. Associated with the 3D map model is metadata that identifies, for example, the direction of the road (a "road vector") being observed by the camera. The camera feed can be initially aligned with the roadway in the map by aligning the traffic vector and the road vector. As the camera moves, the incremental transform of the camera position that will align the road and traffic vectors can be computed, so that the traffic flow in the feed is aligned with the roadway in the map.

For example, the camera may rotate 10 degrees every 10 minutes to produce a panorama of a roadway for which there is 3D road vector data available. The camera can be calibrated with respect to one frame at a given time. As the camera rotates, the one unknown is its rotation angle. By computing the optical flow (traffic vector) in an image, the direction of the road in the image can also be determined (the direction of the road in the image corresponds to the traffic vector). When the 3D road vector data is projected onto the image, the misalignment of the predicted road vector and the optical flow—due to the aforementioned rotation—is detected. The amount of camera rotation that best, or at least satisfactorily, aligns the predicted road vector and the measured optical flow can then be determined. When a camera has a known position but unknown orientation, this technique of finding the amount of camera rotation that aligns the predicted road vector and the measured optical flow can be used to automatically find the camera's orientation.

Camera calibration is facilitated if, for example, there are more than two roadways in the image, particularly if the roadways form a junction. Also, landmarks other than roadways can be utilized to perform the calibration. In general, a known 3D geometry is corresponded to known 2D features (e.g., the optical flow of traffic in an image) to automatically update (realign) a camera's position.

In summary, feeds from cameras are better visualized by superimposing images based on the feeds onto a 2D or 3D map that, in turn, is based on a 3D virtual map. Consequently, the feeds retain their geographic context, making it easier for a user to understand which directions the cameras are pointing and which objects (e.g., streets) they are recording. Moreover, a user can more quickly understand the relation of one camera feed to another.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-readable storage medium that does not consist of a signal, said computer-readable storage medium storing computer-executable instructions that, when executed, cause a computing device to perform a method for visualizing camera feeds, said method comprising:
   displaying information that identifies a plurality of available camera feeds;
   receiving a user selection identifying a first selected camera feed and a second selected camera feed;
   accessing said first selected camera feed and said second selected camera feed from said plurality of available camera feeds;
   accessing data for rendering a map display of a multi-dimensional virtual map;
   associating said first selected camera feed and said second selected camera feed with corresponding regions included in said map display of said multi-dimensional virtual map based on said data;
   superimposing one or more frames of said first selected camera feed and one or more frames of said second selected camera feed onto said corresponding regions included in said map display of said multi-dimensional virtual map, wherein said one or more frames of said first selected camera feed and said one or more frames of said second selected camera feed are aligned with respect to time; and
   rendering said map display of said multi-dimensional virtual map with said one or more frames of said first selected camera feed and said one or more frames of said second selected camera feed being overlaid on said corresponding regions and with a remainder of said map display of said multi-dimensional virtual map being displayed around said corresponding regions.

2. The computer-readable storage medium of claim 1 wherein:
said first selected camera feed comprises a dynamic video feed of vehicles traveling on a roadway,
said map display of said multi-dimensional virtual map includes an image of said roadway, and
said method further comprises aligning said dynamic video feed with said image of said roadway.

3. The computer-readable storage medium of claim 1 wherein said method further comprises:
tracking location and speed of said vehicles to compute positions of said vehicles with respect to time.

4. The computer-readable storage medium of claim 1 wherein said method further comprises:
rendering said one or more frames of said first selected camera feed as an animated texture on a billboard that is superimposed onto said map display of said multi-dimensional virtual map.

5. The computer-readable storage medium of claim 1 wherein:
said multi-dimensional virtual map comprises a digital elevation map (DEM), and
said method further comprises projecting said one or more frames of said first selected feed onto said DEM.

6. The computer-readable storage medium of claim 1 wherein said method further comprises:
removing backgrounds from said one or more frames of said first selected camera feed so that only moving objects are overlaid onto said map display of said multi-dimensional virtual map.

7. The computer-readable storage medium of claim 1 wherein said method further comprises:
replacing actual images of objects in said one or more frames of said first selected camera feed with simulations used in place of said actual images of said objects in said one or more frames of said first selected camera feed.

8. The computer-readable storage medium of claim 1 wherein said method further comprises:
correlating metadata associated with said map display of said multi-dimensional virtual map and information based on said first selected camera feed to calibrate a camera-associated with said first selected camera feed.

9. A computer system comprising:
a user interface operable for displaying information that identifies a plurality of available camera feeds and for receiving a user selection identifying a first selected camera feed and a second selected camera feed; and
memory storing computer-executable components including:
a virtual map model component operable for generating a map display of a multi-dimensional virtual map;
a video imaging component operable for receiving said first selected camera feed and said second selected camera feed; and
a visualization model component coupled to said virtual map model component and said video imaging component, wherein said virtualization model component is operable for:
accessing said first selected camera feed and said second selected camera feed from said video imaging component,
accessing data for rendering said map display of said multi-dimensional virtual map from said virtual map model component,
associating said first selected camera feed and said second selected camera feed with corresponding regions included in said map display of said multi-dimensional virtual map based on said data,
superimposing one or more frames of said first selected camera feed and one or more frames of said second selected camera feed onto said corresponding regions included in said map display of said multi-dimensional virtual map generated from said virtual map model, wherein said one or more frames of said first selected camera feed and said one or more frames of said second selected camera feed are aligned with respect to time, and
rendering said map display of said multi-dimensional virtual map with said one or more frames of said first selected camera feed and said one or more frames of said second selected camera feed being overlaid on said corresponding regions and with a remainder of said map display of said multi-dimensional virtual map being displayed around said corresponding regions.

10. The computer system of claim 9 wherein:
said first selected camera feed comprises a dynamic video feed of vehicles traveling on a roadway,
said map display of said multi-dimensional virtual map includes an image of said roadway, and
said visualization model component is operable for aligning said dynamic video feed with said image of said roadway.

11. The computer system of claim 10 wherein:
location and speed of said vehicles are tracked to compute positions of said vehicles with respect to time.

12. The computer system of claim 9 wherein said one or more frames of said first selected camera feed are rendered as an animated texture on a billboard that is superimposed onto said map display of said multi-dimensional virtual map.

13. The computer system of claim 9 wherein:
said multi-dimensional virtual map comprises a digital elevation map (DEM), and
said one or more frames of said first selected camera feed are projected onto said corresponding region in said DEM.

14. The computer system of claim 9 wherein backgrounds are removed from said one or more frames of said first selected camera feed so that only moving objects are overlaid onto said map display of said multi-dimensional virtual map.

15. The computer system of claim 9 wherein actual images of objects in said one or more frames of said first selected camera feed are replaced with simulations used in place of said actual images of said objects in said one or more frames of said first selected camera feed.

16. The computer system of claim 9 wherein said computer-executable components further include:
a calibration model component operable for calibrating a camera associated with said first selected camera feed using metadata associated with said map display of said multi-dimensional virtual map and information based on said first selected camera feed.

17. A computer-implemented method of visualizing camera feeds, said method comprising:
displaying, by a computing device, information that identifies a plurality of available camera feeds;
receiving, by said computing device, a user selection identifying a first selected camera feed and a second selected camera feed;
accessing, by said computing device, said first selected camera feed and said second selected camera feed from said plurality of available camera feeds;

accessing, by said computing device, data for rendering a map display of a multi-dimensional virtual map;

associating, by said computing device, said first selected camera feed and said second selected camera feed with corresponding regions included in said map display of said multi-dimensional virtual map based on said data;

superimposing, by said computing device, one or more frames of said first selected camera feed and one or more frames of said second selected camera feed onto said corresponding regions included in said map display of said multi-dimensional virtual map, wherein said one or more frames of said first selected camera feed and said one or more frames of said second selected camera feed are aligned with respect to time; and rendering, by said computing device, said map display of said multi-dimensional virtual map with said one or more frames of said first selected camera feed and said one or more frames of said second selected camera feed being overlaid on said corresponding regions and with a remainder of said map display of said multi-dimensional virtual map being displayed around said corresponding regions.

18. The method of claim 17 wherein:

said first selected camera feed comprises a dynamic video feed of vehicles traveling on a roadway, said map display of said multi-dimensional virtual map includes an image of said roadway, and said method further comprises aligning said dynamic video feed with said image of said roadway.

19. The method of claim 18 further comprising:

tracking, by said computing device, location and speed of said vehicles to compute positions of said vehicles with respect to time.

20. The method of claim 17 further comprising:

correlating, by said computing device, metadata associated with said map display of said multi-dimensional virtual map and information based on said first selected camera feed to calibrate a camera associated with said first selected camera feed.

* * * * *